(12) United States Patent
Jiang et al.

(10) Patent No.: US 8,531,965 B2
(45) Date of Patent: Sep. 10, 2013

(54) MESSAGE PROCESSING METHOD AND SYSTEM

(75) Inventors: Xiyuan Jiang, Shanghai (CN); Shukun Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/328,757

(22) Filed: Dec. 16, 2011

(65) Prior Publication Data

US 2012/0087243 A1    Apr. 12, 2012

Related U.S. Application Data

(63) Continuation of application No. 13/020,250, filed on Feb. 3, 2011, which is a continuation of application No. PCT/CN2009/073093, filed on Aug. 5, 2009.

(30) Foreign Application Priority Data

Aug. 7, 2008    (CN) .......................... 2008 1 0041555

(51) Int. Cl.
    H04L 12/26    (2006.01)
(52) U.S. Cl.
    USPC ........................................................ 370/236
(58) Field of Classification Search
    USPC ................ 370/229–231, 235, 236, 241, 248,
        370/252, 254, 351, 389, 255; 455/73, 91,
        455/115.1, 130, 226.1
    See application file for complete search history.

(56) References Cited

U.S. PATENT DOCUMENTS

| 2002/0045448 | A1 | 4/2002 | Park et al. |
| 2007/0072612 | A1* | 3/2007 | Haraguchi et al. ............. 455/436 |
| 2007/0117575 | A1* | 5/2007 | Courau et al. ................. 455/458 |
| 2010/0080170 | A1 | 4/2010 | Larmo et al. |

FOREIGN PATENT DOCUMENTS

| CN | 101056458 A | 10/2007 |
| CN | 101141668 A | 3/2008 |
| CN | 101159486 A | 4/2008 |
| CN | 101207556 A | 6/2008 |
| CN | 101237270 A | 8/2008 |
| CN | 101237273 A | 8/2008 |
| CN | 101237388 A | 8/2008 |
| WO | WO 2005/048489 A1 | 5/2005 |
| WO | WO 2008/073050 A2 | 6/2008 |

OTHER PUBLICATIONS

3GPP, UTRAN Iub interface Node B Application Part (NBAP) signalling (Release 7), Technical Specification Group Radio Access Netowrk, 3GPP TS 25.433, V7.9.0, Jun. 2008, pp. 1-996.*
Written Opinion of the International Searching Authority, PCT/CN2009/073093, Dated Nov. 12, 2009, 5 pages.
International Search Report, PCT/CN2009/073093, Dated Nov. 12, 2009, 6 pages.

(Continued)

*Primary Examiner* — Omar Ghowrwal
(74) *Attorney, Agent, or Firm* — Slater & Matsil, L.L.P.

(57) ABSTRACT

A message processing method includes receiving by a base station a physical shared channel reconfiguration request transmitted from a control radio network controller, the physical shared channel reconfiguration request including priority queue specific deleting information; and deleting a priority queue corresponding to the priority queue specific deleting information.

16 Claims, 3 Drawing Sheets

(56) References Cited

OTHER PUBLICATIONS

3GPP TSG-RAN WG3 Meeting #56, R3-071216, Change Request 25.433 CR 1348 rev. 5, current version: 7.4.0, dated May 7-11, 2007, Kobe, Japan, 123 pages.
3GPP TS 25.433 V7.9.0 (Jun. 2008), "3$^{rd}$ Generation Partnership Project; Technical Specification Group Radio Access Network; UTRAN Iub interface Node B Application Part (NBAP) signalling (Release 7)," dated Jun. 2008, 996 pages.
3GPP TS 25.433 V8.1.0 (Jun. 2008), "3$^{rd}$ Generation Partnership Project; Technical Specification Group Radio Access Network; UTRAN Iub interface Node B Application Part (NBAP) signalling (Release 8)," dated Jun. 2008, 1000 pages.
United States Office Action received in U.S. Appl. No. 13/020,250 mailed Mar. 25, 2013, 33 pages.
First Chinese Office Action with Partial Translation for Chinese Application No. 201110287950.3 dated May 21, 2013, 6 pages.
Chinese Search Report for Chinese Application No. 201110287950.3, dated May 12, 2013, 2 pages.
Yao, M-j, et al., Research on TD-SCDMA Terminal Reconfiguration, Communications Technology, vol. 40, No. 11, 2007, pp. 178-179.

* cited by examiner

MESSAGE PROCESSING METHOD AND SYSTEM

This application is a continuation of U.S. patent application Ser. No. 13/020,250, filed on Feb. 3, 2011, which is a continuation of International Application No. PCT/CN2009/073093, filed on Aug. 5, 2009, which claims priority to Chinese Patent Application No. 200810041555.5, filed on Aug. 7, 2008, all of which are hereby incorporated by reference in their entireties.

TECHNICAL FIELD

This invention relates to the field of communications technology, and more particularly to a message processing method and system.

BACKGROUND

With the continued development of communications technology, more and more demand has been put on ever quicker transmission of data. For instance, increasingly higher demand data transmission rate has been required of, for example, the current global system for mobile communications (GSM), general packet radio service (GPRS), wideband code division multiple access (WCDMA), code division multiple access (CDMA), and next-generation evolution systems. The WCDMA system is taken as an example below for making further explanations.

By virtue of enhanced forward access channel (FACH) characteristics and enhanced paging channel (PCH) characteristics, data originally carried on the forward access channel and the paging channel may be transmitted over the high speed downlink shared channel (HS-DSCH), and thus the high speed characteristics of the HS-DSCH may be made use of to reduce the time delay during which the CELL forward access channel (CELL_FACH) state, the CELL paging channel (CELL_PCH) state and the UTRAN registration area-paging channel (URA_PCH) state are switched to the CELL dedicate channel (CELL_DCH) state, and the characteristics may also be used to enable user equipment to achieve quicker data transmission under non-CELL_DCH, thereby enhancing the experience at the terminal user of being kept forever online.

Currently, for the enhanced forward access channel state in a physical shared channel reconfiguration request message according to 25.433 protocol, the physical shared channel reconfiguration request message may include an information element (IE) of "high-speed downlink shared channel (HS-DSCH) common system information" and an IE of "common medium access control (MAC) flows to delete." If the physical shared channel reconfiguration request received by a base station (such as a NodeB) carries therewith an IE of "common system information," the NodeB will use the parameters of the IE of "common system information" in the new configuration to configure the enhanced forward access channel state, and if the physical shared channel reconfiguration request received by the NodeB carries therewith the IE of "common medium access control flows to delete," the NodeB will delete the medium access control flow (MAC Flow) designated in the IE.

For the enhanced paging channel state, the physical shared channel reconfiguration request message may include an IE of "high-speed downlink shared channel (HS-DSCH) paging system information" and an IE of "paging medium access control (MAC) flows to delete." If the physical shared channel reconfiguration request received by the NodeB carries therewith the IE of "paging system information," the NodeB will use the parameters of the IE of "paging system information" in the new configuration to configure the enhanced paging channel state, and if the physical shared channel reconfiguration request received by the NodeB carries therewith the IE of "paging medium access control flows to delete," the NodeB will delete the medium access control flow designated in the IE.

For the enhanced forward access channel state and/or the enhanced paging channel state, if the NodeB does not know how to specifically process after receiving the relevant IE in the physical shared channel reconfiguration request. The NodeB may, taking the IE of "common system information" in the enhanced forward access channel state for example, interpret the IE of "common MAC flow specific information" either as newly established or as both newly established and reconfigured. If it is interpreted as both newly established and reconfigured, the IE of "common MAC flow priority queue information" in the IE of "common MAC flow specific information" will have similar ambiguities. Moreover, under the current setup of parameters, the priority queue under the same medium access control flow may only be added and may not be subtracted, i.e., the NodeB may not delete a priority queue. When the NodeB interprets the IE both as newly established and reconfigured, it does not know how to process the transport bearer while reconfiguring a medium access control flow.

After the NodeB receives the physical shared channel reconfiguration request message, communications error might be engendered.

SUMMARY OF THE INVENTION

In embodiments of the present invention, a message processing method and system is provided, whereby communications may be normally performed.

Objects of the embodiments of the present invention are realized by the following technical solutions.

One message processing method, comprising: receiving a reconfiguration request transmitted from a control radio network controller, the physical shared channel reconfiguration request including priority queue specific deleting information; and deleting a priority queue corresponding to the priority queue specific deleting information.

A message processing method, comprising: receiving a physical shared channel reconfiguration request transmitted from a control radio network controller, the physical shared channel reconfiguration request including a transport bearer request indicator information; and updating configuration of the transport bearer, if the transport bearer request indicator information indicates that the transport bearer needs to be reestablished.

A message processing method, comprising: receiving a physical shared channel reconfiguration request transmitted from a control radio network controller, the physical shared channel reconfiguration request including medium access control flow information; and reconfiguring a medium access control flow corresponding to the medium access control flow information or transmitting a process failure message to the control radio network controller, if the medium access control flow exists in a current base station.

In one embodiment a base station includes a receiving unit that is configured to receive a physical shared channel reconfiguration request transmitted from a control radio network controller, the physical shared channel reconfiguration request including priority queue specific deleting information; and a processing unit that is configured to delete a priority queue corresponding to the priority queue specific deleting information.

In another embodiment, a base station includes a transport bearer request indicator receiving unit that is configured to receive a physical shared channel reconfiguration request transmitted from a control radio network controller, the physical shared channel reconfiguration request including transport bearer request indicator information; a request indicator determining unit that is configured to determine whether the transport bearer request indicator information indicates that the transport bearer needs to be reestablished; and an updating unit that is configured to update configuration of the transport bearer, if the request indicator determining unit determined that the transport bearer request indicator information indicates the transport bearer needs to be reestablished.

In another embodiment, a base station includes a request receiving unit that is configured to receive a physical shared channel reconfiguration request transmitted from a control radio network controller, the physical shared channel reconfiguration request including medium access control flow information; a determining unit that is configured to determine whether a medium access control flow corresponding to the medium access control flow information exists; and an executing unit that is configured to reconfigure the medium access control flow or to transmit a process failure message to the control radio network controller, if the determining unit determines that the medium access control flow exists.

In another embodiment, a communication system includes a control radio network controller that is configured to transmit a physical shared channel reconfiguration request to a base station, the physical shared channel reconfiguration request including priority queue specific deleting information; and a base station that is configured to receive the physical shared channel reconfiguration request, which includes priority queue specific deleting information, transmitted from the control radio network controller, and to delete a priority queue corresponding to the priority queue specific deleting information.

In another embodiment, a communication system includes a control radio network controller configured to transmit a physical shared channel reconfiguration request to a base station, the physical shared channel reconfiguration request including transport bearer request indicator information; and a base station that is configured to receive the physical shared channel reconfiguration request, which includes transport bearer request indicator information, transmitted from the control radio network controller, to determine whether the transport bearer request indicator information indicates that the transport bearer needs to be reestablished, and to update configuration of the transport bearer if the transport bearer request indicator information indicates that the transport bearer needs to be reestablished.

In another embodiment, a communication system includes a control radio network controller configured to transmit a physical shared channel reconfiguration request to a base station, the physical shared channel reconfiguration request including medium access control flow information; and a base station that is configured to receive the physical shared channel reconfiguration request, which includes medium access control flow information, transmitted from the control radio network controller, to determine whether a medium access control flow corresponding to the medium access control flow information exists, and to reconfigure the medium access control flow or transmit a process failure message to the control radio network controller, if it is determined that the medium access control flow exists.

As can be seen from the foregoing technical solutions provided in the embodiments of the present invention, since the physical shared channel reconfiguration request including the priority queue specific deleting information is received, and the priority queue corresponding to the priority queue specific deleting information is deleted, the NodeB may delete a priority queue, and it is flexible to maintain the priority queue, so that the NodeB is more fully equipped with functions. Since the physical shared channel reconfiguration request may include the transport bearer request indicator information, the configuration of the transport bearer may be updated if the transport bearer request indicator information indicates that the transport bearer needs to be reestablished, so that the process of the transport bearer is specified to the NodeB during reconfiguration, whereby communication is normally performed.

BRIEF DESCRIPTION OF THE DRAWINGS

To make clearer the technical solutions in the embodiments of the present invention or in the prior art, accompanying drawings necessary to illustrate the embodiments or the prior art are briefly introduced below. Apparently, the accompanying drawings presented below are merely directed to some of the embodiments of the present invention, as it is possible for those ordinarily skilled in the art to obtain other drawings according to these drawings without creative effort.

DETAILED DESCRIPTION OF ILLUSTRATIVE EMBODIMENTS

Technical solutions according to the embodiments of the present invention are described below with reference to the accompanying drawings. Apparently, the embodiments as described are merely some, rather than all, embodiments of the present invention. All other embodiments obtainable by those ordinarily skilled in the art based on the described embodiments of the present invention and without creative effort shall fall within the protection scope of the present invention.

The message processing method, apparatus and communication system provided in the embodiments of the present invention are applicable to the currently available GSM, GPRS, WCDMA, CDMA systems and next generation evolution systems.

Through the technical solutions provided in the embodiments of the present invention, it is possible to enhance the functions of a base station. The process of a transport bearer is specified to the base station during reconfiguration, and the base station is enabled to execute the process consistent with what is instructed by a control radio network controller.

The WCDMA system is taken as an example to make explanations below. The operating and processing processes are similar for other communication systems.

For the enhanced forward access channel state and the enhanced paging channel state, a NodeB no longer has misinterpretations in the understanding of their relevant IEs. However, the IEs are carried in the physical shared channel reconfiguration request message transmitted from a control radio network controller (CRNC) to the NodeB. The NodeB may delete the priority queue corresponding to the priority queue specific deleting information according to the priority queue specific deleting information carried therewith, and may also be notified of the process of the transport bearer according to the added transport bearer request indicator information. The enhanced forward access channel state is taken as an example to make explanation in the following embodiments, while the circumstance for the enhanced paging channel state is similar to the enhanced forward access channel state.

Firstly presented below is an embodiment in which the priority queue specific deleting information is included in the physical channel reconfiguration request message.

A message processing method is described in one embodiment, in which an IE of "common MAC flow priority queue to delete" is carried in the physical channel reconfiguration request message, whereas the physical channel reconfiguration request message carries the IE of "paging MAC flow priority queue to delete" for the enhanced paging channel state.

Figure 1:
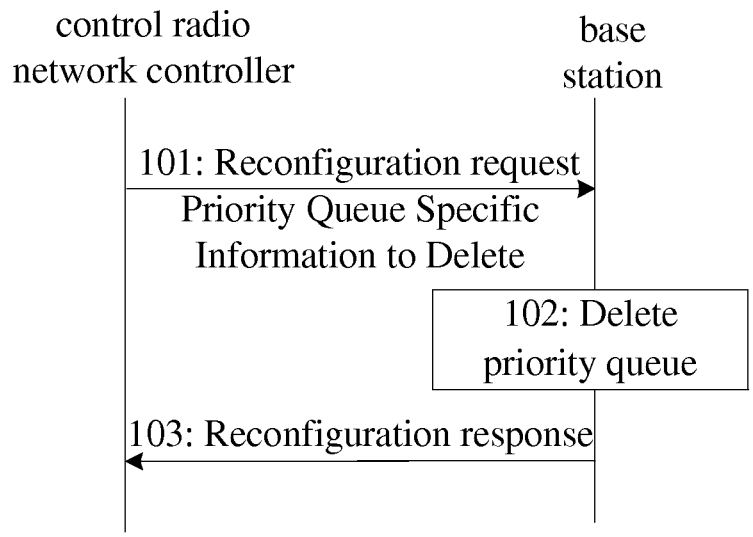
FIG. 1 is a flowchart illustrating a message processing method according to an embodiment of the present invention.

Explanation is made below taking as an example the method of carrying the IE of "common MAC flow priority queue to delete" and with reference to the accompanying drawings, while the method of carrying the IE of "paging MAC flow priority queue to delete" is similar thereto and not redundantly described here. Referring to FIG. 1, the method may include the following contents.

Step 101: a physical shared channel reconfiguration request is transmitted from a control radio network controller (CRNC) to a NodeB. The reconfiguration request includes priority queue specific deleting information.

For instance, the NodeB receives a physical shared channel reconfiguration request transmitted from the CRNC, the reconfiguration request includes the priority queue specific deleting information, and the priority queue specific deleting information may include a priority queue designated to be deleted, or it may include an ID corresponding to a priority queue designated to be deleted.

Taking the enhanced forward access channel state for example, the physical shared channel reconfiguration request message transmitted from the CRNC to the NodeB includes an IE of "common system information", the IE of "common system information" includes an IE of "common MAC flow specific information", and the IE of "common MAC flow specific information" may carry therewith an IE of "common MAC flow priority queue to delete". In another embodiment of the present invention, the carried IE is not limited to the above appellation, and may be set as an optional IE.

Step 102: a priority queue corresponding to the priority queue specific deleting information is deleted.

For instance, the NodeB has the ability to delete the priority queue already existent in the medium access control flow.

In such case, the NodeB has deleted the designed priority queue according to an instruction of the CRNC. In order that communication between the NodeB and the CRNC is better carried out, in another embodiment of the present invention, the message processing method further includes the following.

Step 103: the NodeB transmits a physical shared channel reconfiguration response to the CRNC.

The NodeB transmits the physical shared channel reconfiguration response to the CRNC to facilitate subsequent communication between them.

In this embodiment, after receiving the physical shared channel reconfiguration request that includes the priority queue specific deleting information, the priority queue corresponding to the priority queue specific deleting information is deleted. The NodeB being capable of deleting the priority queue makes the maintenance of the priority queue more flexible, and the NodeB is more fully equipped with functions.

A message processing method has been described in the first embodiment, in which a priority queue may be deleted.

In another embodiment, the message processing method is a method for configuring transport bearer according to transport bearer request indicator information.

Another embodiment is directed to a message processing method, wherein transport bearer is processed according to indication of the transport bearer request indicator information included in the physical channel reconfiguration request message.

Figure 2:
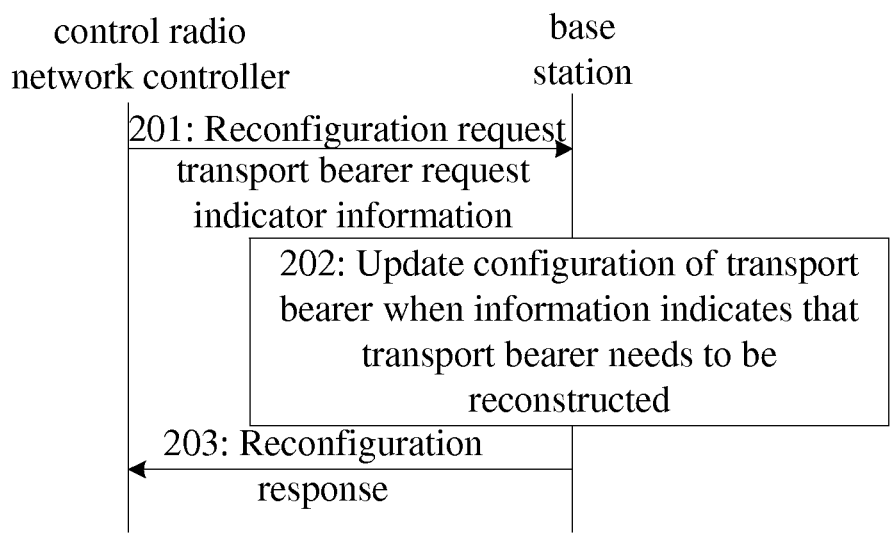
FIG. 2 is a s flowchart illustrating another message processing method according to another embodiment of the present invention.

Detailed explanation is made below with reference to the accompanying drawings. Referring to FIG. 2, the method comprises the following.

Step 201: A physical shared channel reconfiguration request is transmitted from a control radio network controller (CRNC) to a NodeB, the reconfiguration request including transport bearer request indicator information.

For instance, the NodeB receives the physical shared channel reconfiguration request transmitted from the CRNC, and the reconfiguration request includes the transport bearer request indicator information.

For the enhanced forward access channel state, the IE of "common medium access control flow specific information" carries therewith the IE of "transport bearer request indicator"; for the enhanced paging channel state, the reconfiguration request comprises the IE of "paging system information," while the IE of "paging system information" comprises the IE of "paging MAC flow specific information," and the IE of "paging MAC flow specific information" carries therewith the IE of "transport bearer request indicator." In another embodiment of the present invention, the carried IE is not limited to the above appellation, and may be set as an optional IE. The IE of "transport bearer request indicator" is valid only if a medium access control flow is reconfigured, and it is possible to judge whether reconfiguring the medium access control flow according to whether the NodeB currently has the medium access control flow. The medium access control flow needs to be reconfigured only if the current NodeB includes the medium access control flow which the medium access control flow information carried in the physical shared channel reconfiguration request message corresponds to.

Step 202: The configuration of transport bearer is updated if the transport bearer request indicator information indicates that the transport bearer needs to be reestablished, and the transport bearer is not reestablished if the transport bearer request indicator information indicates that the transport bearer doesn't need to be reestablished.

For instance, the determining process may be carried out by the base station, such as NodeB, and the process of the transport bearer is specified to the NodeB during each reconfiguration according to the indication of the transport bearer request indicator information.

In another embodiment of the present invention, if the carried IE is the IE of "transport bearer request indicator", the NodeB determines whether the transport bearer request indicator information indicates that the transport bearer needs to be reestablished. If yes, configuration of the transport bearer is updated. For instance, the updated configuration may include at least one of the following: configuration of the binding ID, configuration of the transport layer address, and configuration of the transport network layer quality of service (TNL QoS).

In such case, the NodeB has processed the transport bearer according to instruction of the CRNC. In order that communication between the NodeB and the CRNC is better carried out, the method may further comprise the following.

Step 203: A physical shared channel reconfiguration response to the CRNC is transmitted, the reconfiguration response including information indicating that the transport bearer has been updated.

By transmitting the physical shared channel reconfiguration response to the CRNC, the NodeB may notify the CRNC of the result of processing the physical shared channel reconfiguration request transmitted from the CRNC, so as to facilitate subsequent communication between them.

In this embodiment, NodeB receives the physical shared channel reconfiguration request that includes the transport bearer request indicator information. If the transport bearer request indicator information indicates that the transport bearer needs to be reestablished, the configuration of the transport bearer is updated, and thus the process of the transport bearer is specified to the NodeB during MAC flow reconfiguration.

Described above is a message processing method specifying the NodeB as that how to process the transport bearer.

Described below is a method of the NodeB removing misinterpretations in the physical shared channel reconfiguration request message and how to process abnormal circumstances present in the physical shared channel reconfiguration request message.

Another embodiment describes a message processing method, which is described in detail below with reference to FIG. 3.

Block 301: A physical shared channel reconfiguration request is transmitted from a control radio network controller (CRNC) to a NodeB, and the reconfiguration request including medium access control flow information.

For instance, the NodeB receives the physical shared channel reconfiguration request transmitted from the CRNC, and the reconfiguration request includes medium access control flow information.

In another embodiment of the present invention, the medium access control flow information may be a medium access control flow ID, or, common or paging medium access control flow specific information.

In another embodiment of the present invention, the medium access control flow information may include priority queue information.

In another embodiment of the present invention, the physical shared channel reconfiguration request message may further include medium access control flow deleting information.

In another embodiment of the present invention, the medium access control flow deleting information may be the IE of "common medium access control flows to delete" or the IE of "paging medium access control flows to delete".

Block 302: A medium access control flow is reconfigured or a process failure message is transmitted to the control radio network controller, if the medium access control flow corresponding to the medium access control flow information exists in a current base station.

For instance, the determining and reconfiguring processes may be carried out by a base station, such as NodeB.

For instance, if the medium access control flow information includes the priority queue information, the NodeB determines whether a priority queue corresponding to the priority queue information exists in the current NodeB. If the priority queue exists in the current NodeB, the NodeB reconfigures the priority queue; if the priority queue does not exist in the current NodeB, the NodeB newly establishes the priority queue.

Taking the enhanced forward access channel state for example, the NodeB understands "common medium access control flow specific information" IE in "common system information" IE, as both newly established and reconfigured. If the medium access control flow carried in the physical shared channel reconfiguration request information does not exist in the current NodeB, the NodeB newly establishes the medium access control flow; if already existing, the NodeB reconfigures the medium access control flow.

In another embodiment of the present invention, as for the IE of "common medium access control flow priority queue information" in the IE of "common medium access control flow specific information," if the priority queue carried in the physical shared channel reconfiguration request message does not exist in the current NodeB, the NodeB newly establishes a priority queue; if already existing, the NodeB reconfigures the priority queue. For instance, if the base station determines that the medium access control flow corresponding to the medium access control flow information does not exist, a medium access control flow and/or a priority queue is/are newly established (that is to say, if the medium access control flow corresponding to the medium access control flow information does not exist in the current base station, a medium access control flow and/or a priority queue is/are newly established). The mode for processing the enhanced paging channel state is similar to the mode for processing the enhanced forward access channel state, and hence not redundantly described here.

In another embodiment of the present invention, taking the enhanced forward access channel state for example, the physical shared channel reconfiguration request message contains therein the IE of "common medium access control flows to delete." If the NodeB determines that the medium access control flow to be deleted through indication of the IE of "common medium access control flows to delete" does not exist, the NodeB ignores the IE, and ensures that there isn't the medium access control flow indicated to be deleted through the IE of in the configuration after reconfiguration. For instance, if the physical shared channel reconfiguration request message comprises the medium access control flow deleting information, and the medium access control flow corresponding to the medium access control flow deleting information does not exist, the base station ignores the medium access control flow deleting information and transmits a response message to the control radio network controller. The mode for processing the enhanced paging channel state is similar to the mode for processing the enhanced forward access channel state, and hence not redundantly described here.

In another embodiment of the present invention, taking the enhanced forward access channel state for example, the physical shared channel reconfiguration request message contains therein the IE of "common medium access control flows to delete." If the medium access control flow to be deleted by the IE of "common medium access control flows to delete" does not exist, the NodeB may return a failure message. For instance, if the physical shared channel reconfiguration request message includes the medium access control flow deleting information, and the base station determines that the medium access control flow corresponding to the medium access control flow information deleting information does not exist, the base station may transmit a process failure message to the control radio network controller. The mode for processing the enhanced paging channel state is similar to the mode for processing the enhanced forward access channel state, and hence not redundantly described here.

In another embodiment of the present invention, if it is needed to reconfigure the medium access control flow, it is also possible not to carry the IE of "transport bearer request indicator," but to reestablish the transport bearer each time the NodeB reconfigures the medium access control flow. For instance, if the base station determines that the medium access control flow corresponding to the medium access control flow information exists, the base station reestablishes the transport bearer (that is to say, if the medium access control flow corresponding to the medium access control flow information exists in the current base station, the transport bearer is reestablished), and the base station reconfigures the medium access control flow according to the reestablished transport bearer.

In another embodiment of the present invention, for the enhanced forward access channel state, the NodeB may understand the IE of "common medium access control flow specific information" of "common system information" IE only as newly established. If the medium access control flow carried in the physical channel reconfiguration request exists in the current NodeB, a process failure message is transmitted to the control radio network controller; if it is intended to modify the medium access control flow, it is possible to use a single IE for reconfiguring the medium access control flow. For instance, if the base station determines that the medium access control flow corresponding to the medium access control flow information exists, the base station transmits a process failure message to the control radio network controller (that is to say, if the medium access control flow corresponding to the medium access control flow information exists in the current base station, a process failure message is transmitted to the control radio network controller). The base station receives the IE for reconfiguring the medium access control flow. The base station reconfigures the medium access control flow according to the IE for reconfiguring the medium access control flow. The mode for processing the enhanced paging channel state is similar to the mode for processing the enhanced forward access channel state, and hence not redundantly described here.

In another embodiment of the present invention, for the enhanced forward access channel state, the NodeB may understand the IE of "medium access control flow specific information" in "common system information" IE only as newly established. If the medium access control flow carried in the physical channel reconfiguration request exists in the current NodeB, the NodeB may transmit a process failure message to the control radio network controller; if it is intended to modify the medium access control flow, the NodeB may firstly delete the medium access control flow to be modified, and then newly establish a medium access control flow; that is to say, modification is carried out by firstly deleting and subsequently establishing. The mode for processing the enhanced paging channel state is similar to the mode for processing the enhanced forward access channel state, and hence not redundantly described here.

In another embodiment of the present invention, for the enhanced forward access channel state, no identical medium access control flow is allowed to appear in "common system information" IE and "common medium access control flows to delete" IE of the same physical shared channel reconfiguration request message; otherwise, a failure message is returned. For instance, after a base station, for example the NodeB receives the physical shared channel reconfiguration request transmitted from the CRNC, the base station determines whether a medium access control flow in the medium access control flow information is the same as that in the medium access control flow deleting information. If it is the same, the base station transmits a process failure message to the control radio network controller. The mode for processing the enhanced paging channel state is similar to the mode for processing the enhanced forward access channel state, and hence not redundantly described here.

In this embodiment, the base station (such as NodeB) determines whether the medium access control flow exists by receiving the physical shared channel reconfiguration request transmitted from the control radio network controller (such as CRNC), and the specific processing mode is specified to the base station, so that the base station is enabled to execute the process consistent with what is instructed by the control radio network controller. The base station may make specific processing on the misinterpretations and abnormal circumstances present in the physical shared channel reconfiguration request message.

The base station in the aforementioned embodiments determines whether the medium access control flow exists by receiving the physical shared channel reconfiguration request transmitted from the control radio network controller, and the specific processing mode is specified to the base station, so that the base station is enabled to execute the process consistent with what is instructed by the control radio network controller.

The message processing method is described above, and the relevant apparatus will be described below. Refer to the foregoing detailed description of the method embodiment for the specific operating process of each of the devices or units or modules, while no repetition will be made here.

Figure 4:
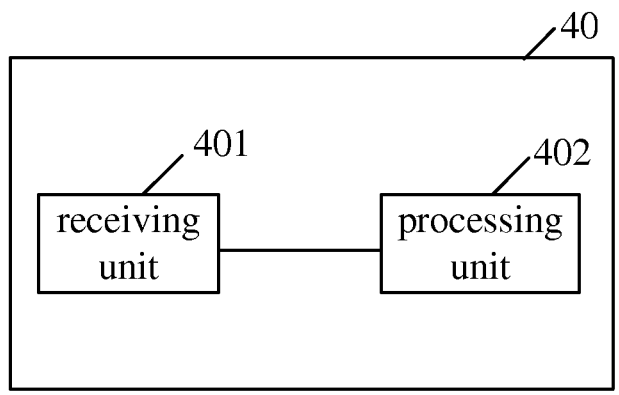
FIG. 4 is a block diagram of a base station according to another embodiment of the present invention.

Referring to FIG. 4, a base station 40, such as a NodeB includes a receiving unit 401 and a processing unit 402. The receiving unit 401 is configured to receive a physical shared channel reconfiguration request transmitted from a control radio network controller (such as CRNC). The reconfiguration request includes priority queue specific deleting information. The processing unit 402 is configured to delete a priority queue corresponding to the priority queue specific deleting information received by the receiving unit 401.

In another embodiment of the present invention, the base station 40 further comprises a response transmitting unit configured to transmit a physical shared channel reconfiguration response to the control radio network controller.

Reference can be made to the relevant description of the embodiment corresponding to FIG. 1 for the specific operating process of the receiving unit 401, the processing unit 402 and the response transmitting unit in the base station 40. For simplicity, the description is not repeated here.

Figure 5:
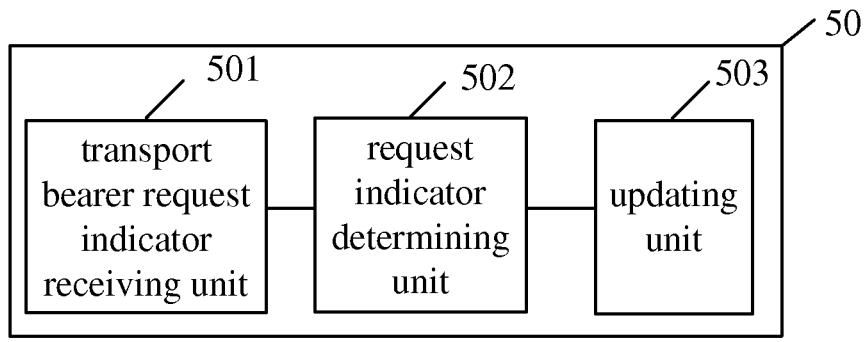
FIG. 5 is a block diagram of another base station according to another embodiment of the present invention.

Referring to FIG. 5, a base station 50, such as a NodeB includes a transport bearer request indicator receiving unit 501, a request indicator determining unit 502 and an updating unit 503. The transport bearer request indicator receiving unit 501 is configured to receive a physical shared channel reconfiguration request transmitted from a control radio network controller (such as CRNC). The reconfiguration request includes transport bearer request indicator information. The request indicator determining unit 502 is configured to determine whether the transport bearer request indicator information received by the transport bearer request indicator receiving unit 501 indicates that the transport bearer needs to be reestablished. The updating unit 503 is configured to update configuration of the transport bearer, if the request indicator determining unit 502 determines that the transport bearer request indicator information indicates the transport bearer needs to be reestablished.

In another embodiment of the present invention, the base station 50 further comprises a reconfiguration response transmitting unit configured to transmit a reconfiguration response to the control radio network controller. The reconfiguration response includes information indicating that the transport bearer has been updated.

The relevant description of the embodiment corresponding to FIG. 2 can be referred to for the specific operating process of the transport bearer request indicator receiving unit 501, the request indicator determining unit 502, the updating unit 503 and the reconfiguration response transmitting unit in the base station 50. For simplicity, this description is not repeated here.

Figure 6:
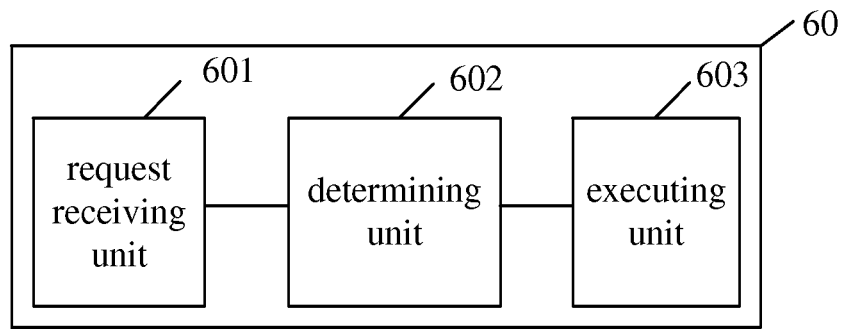
FIG. 6 is a block diagram of another base station according to another embodiment of the present invention.

Referring to FIG. 6, a base station 60, such as a NodeB includes a request receiving unit 601, a determining unit 602 and an executing unit 603. The request receiving unit 601 is configured to receive a physical shared channel reconfiguration request transmitted from a control radio network controller (such as CRNC). The reconfiguration request includes medium access control flow information. The determining unit 602 is configured to determine whether a medium access control flow corresponding to the medium access control flow information received by the request receiving unit 601 exists in the current base station 60, for example, whether the medium access control flow is in a storing unit of the base station 60. The executing unit 603 is configured to reconfigure the medium access control flow or transmitting a process failure message to the control radio network controller, if the determining unit 602 determines that the medium access control flow exists in the current base station 60.

In another embodiment of the present invention, the base station 60 further comprises a newly-establishing unit configured to newly establish a medium access control flow, if the determining unit 602 determines that the medium access control flow does not exist.

In another embodiment of the present invention, the request receiving unit 601 may further receive a priority queue, and the determining unit 602 may further determine whether the priority queue exists in the current base station 60. If the priority queue exists in the current base station 60, the executing unit 603 further reconfigures the priority queue, and if the priority queue does not exist in the current base station 60, the newly-establishing unit newly establishes a priority queue.

In another embodiment of the present invention, the request receiving unit 601 may further receive the medium access control flow deleting information, and the base station 60 further comprises a response message transmitting unit, for ignoring the medium access control flow deleting information and transmitting a response message to the control radio network controller or transmitting a process failure message to the control radio network controller, if the determining unit 602 determines that the medium access control flow corresponding to the medium access control flow information does not exist.

In another embodiment of the present invention, if the NodeB determines that the medium access control flow corresponding to the medium access control flow information exists in the current base station 60, the executing unit 603 may further reestablish a transport bearer, and reconfigure the medium access control flow according to the reestablished transport bearer.

In another embodiment of the present invention, if the determining unit 602 determines that the medium access control flow corresponding to the medium access control flow information exists in the current base station 60, the response message transmitting unit may further transmit a process failure message to the control radio network controller, the request receiving unit 601 may further receive an IE for reconfiguring the medium access control flow, and the executing unit 603 may further use the IE for reconfiguring the medium access control flow to reconfigure the medium access control flow.

In another embodiment of the present invention, the request receiving unit 601 may further receive medium access control flow deleting information, the determining unit 602 may further determine whether the medium access control flow corresponding to the medium access control flow deleting information is the same as the medium access control flow corresponding to the medium access control flow information, and the response message transmitting unit may further transmit a process failure message to the control radio network controller if the medium access control flow corresponding to the medium access control flow deleting information is the same as the medium access control flow corresponding to the medium access control flow information.

Figure 3:
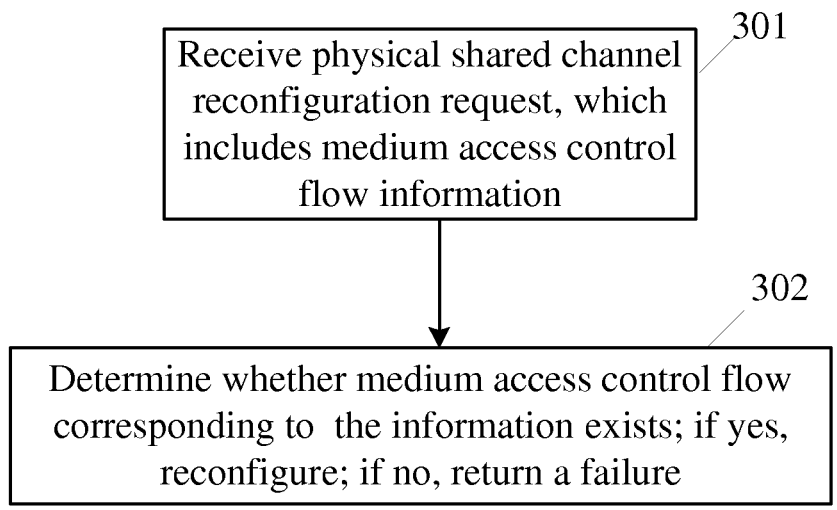
FIG. 3 is a flowchart illustrating another message processing method according to another embodiment of the present invention.

The relevant description of the embodiment corresponding to FIG. 3 can be referred to for the specific operating process of the request receiving unit 601, the determining unit 602, the executing unit 603 and the newly-establishing unit in the base station 60. For simplicity, this description is not repeated here.

Figure 7:
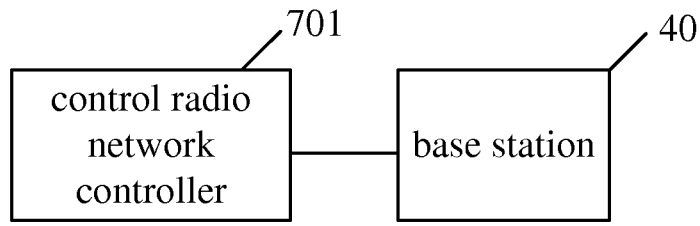
FIG. 7 is a block diagram of a communication system according to another embodiment of the present invention.

Referring to FIG. 7, a communication system includes a control radio network controller 701 and a base station 40. The control radio network controller 701 is configured to transmit a physical shared channel reconfiguration request to a base station 40 (same as in FIG. 4). The reconfiguration request including priority queue specific deleting information. The base station 40 is configured to receive the physical shared channel reconfiguration request, which includes priority queue specific deleting information, transmitted from the control radio network controller 701, and to delete a priority queue corresponding to the priority queue specific deleting information.

In another embodiment of the present invention, the control radio network controller 701 may further receive a reconfiguration response transmitted from the base station 40, and the base station 40 may further transmit a reconfiguration response to the control radio network controller 701.

Figure 8:
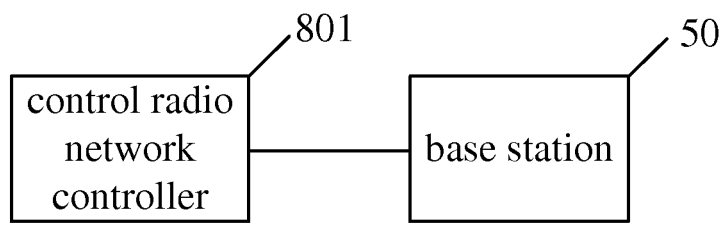
FIG. 8 is a block diagram of another communication system according to another embodiment of the present invention.

Referring to FIG. 8, a communication system includes a control radio network controller 801 and a base station 50. The control radio network controller 801 is configured to transmit a physical shared channel reconfiguration request to the base station 50 (same as in FIG. 5). The reconfiguration request includes transport bearer request indicator information. The base station 50 is configured to receive the physical shared channel reconfiguration request, which includes transport bearer request indicator information, transmitted from the control radio network controller 801, to determine whether the transport bearer request indicator information indicates that the transport bearer needs to be reestablished, and to update configuration of the transport bearer if the transport bearer request indicator information indicates that the transport bearer needs to be reestablished.

In another embodiment of the present invention, the control radio network controller 801 may further receive a reconfiguration response, which includes information indicating that the transport bearer has been updated, transmitted from the base station 50. The base station 50 may further transmit a reconfiguration response, which includes information indicating that the transport bearer has been updated, to the control radio network controller 801.

Figure 9:
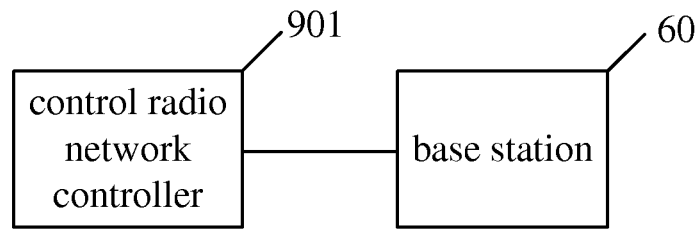
FIG. 9 is a block diagram of another communication system according to another embodiment of the present invention.

Referring to FIG. 9, a communication system includes a control radio network controller 901 and a base station 60. The control radio network controller 901 is configured to transmit a physical shared channel reconfiguration request, which includes medium access control flow information, to the base station 60 (same as in FIG. 6), and to receive a process failure message transmitted from the base station 60. The base station 60 is configured to receive the physical shared channel reconfiguration request, which includes medium access control flow information, transmitted from the control radio network controller 901, to determine whether a medium access control flow corresponding to the medium access control flow information exists, and to reconfigure the medium access control flow or transmitting a process failure message to the control radio network controller 901, if the medium access control flow exists.

In another embodiment of the present invention, the base station 60 may further newly establish a medium access control flow if it is determined that the medium access control flow corresponding to the medium access control flow information does not exist.

In another embodiment of the present invention, the control radio network controller 901 may further transmit a priority queue, which is comprised in the medium access control flow information, and the base station 60 may further determine whether the priority queue exists in the current base station, reconfigure the priority queue if the priority queue exists in the current base station, and newly establish a priority queue if the priority queue does not exist in the current base station.

In another embodiment of the present invention, the control radio network controller 901 may further transmit the medium access control flow deleting information to the base station 60, and receive a response message or a process failure message transmitted from the base station 60. The base station 60 may further ignore the medium access control flow deleting information and transmit a response message to the control radio network controller 901 or transmit a process failure message to the control radio network controller 901, if it is determined that the medium access control flow corresponding to the medium access control flow information deleting information does not exist.

In another embodiment of the present invention, the base station 60 may further reestablish the transport bearer, and reconfigure the medium access control flow according to the reestablished transport bearer, if it is determined that the medium access control flow corresponding to the medium access control flow information exists.

In another embodiment of the present invention, the control radio network controller 901 may further transmit an IE for reconfiguring the medium access control flow to the base station 60, and the base station 60 may further receive the IE for reconfiguring the medium access control flow, and reconfigure the medium access control flow according to the IE.

In another embodiment of the present invention, the control radio network controller 901 may further transmit the medium access control flow deleting information, and the base station 60 may further determine whether the medium access control flow corresponding to the medium access control flow deleting information is the same as the medium access control flow corresponding to the medium access control flow information, and transmit a process failure message to the control radio network controller 901 if it is the same.

According to the embodiments of the present invention, since the physical shared channel reconfiguration request including the priority queue specific deleting information is received, and the priority queue corresponding to the priority queue specific deleting information is deleted, the base station may delete the priority queue, whereby maintenance of the priority queue is more flexible, so that the base station is more fully equipped with functions.

In the embodiments of the present invention, the base station receives the physical shared channel reconfiguration request including the transport bearer request indicator information, and updates the configuration of the transport bearer if the transport bearer request indicator information indicates that the transport bearer needs to be reestablished, so that the process of the transport bearer is specified to the base station during reconfiguration.

According to the embodiments of the present invention, the base station determines whether the medium access control flow exists by receiving the physical shared channel reconfiguration request transmitted from the control radio network controller, and the specific processing mode is specified to the base station, so that the base station is enabled to execute the process consistent with what is instructed by the control radio network controller.

By the foregoing description of the embodiments, persons skilled in the art may clearly understand that the present invention may be implemented via software plus the necessary general hardware platform, and may of course be implemented via hardware alone, but the former mode is a preferred embodiment under many circumstances. Based on such understanding, the substance of the technical solution of the present invention, or the portion of the invention that makes contribution to the prior art, may be embodied in the form of a computer software product that is stored in a non-transient storage medium and contains plural instructions enabling a computer device (which may be a personal computer, a server, or a network device, etc.) to execute the entire or partial contents of the methods recited in the embodiments of the present invention. The storage medium includes various media capable of storing program codes, such as an ROM, an RAM, a magnetic disk, or an optical disk, etc.

As should be comprehended, the system, apparatus and method disclosed in the embodiments provided by the present application may be realized by other modes without departing from the principle and scope of the present application. The embodiments are merely taken as examples rather than restrictions, and the specific contents provided thereby should not restrict the objects of the present application. For instance, a plurality of units or component parts may be combined or integrated into another system, or certain features may be either omitted or not executed.

Moreover, the system, apparatus and method as described and the schematic views of the different embodiments may be combined or integrated with other systems, modules, techniques or methods without departing from the scope of the present application. Furthermore, intra-couplings or direct couplings or communicative connections as illustrated or discussed may be indirect couplings or communicative connections between/among certain interfaces, devices or units in electric, mechanical or other forms.

The message processing method, apparatus and communication system provided in the embodiments of the present invention are presented in details above, and description of the foregoing embodiments merely aim to help understand the method and concept of the present invention. Meanwhile, any modification, equivalent substitution and improvement conceivable to those ordinarily skilled in the art within the spirit and scope of the present application shall fall within the protection scope of the present application.

What is claimed is:

1. A message processing method, comprising:
receiving, by a base station, a physical shared channel reconfiguration request transmitted from a radio network controller, the physical shared channel reconfiguration request comprising information for modifying configuration of a medium access control flow that is a data flow, wherein the information for modifying configuration of the medium access control flow comprises a transport bearer request indicator which indicates whether a transport bearer between the radio network controller and the base station corresponding to the medium access control flow needs to be reestablished and is valid only when the medium access control flow is reconfigured; and
when the base station determines that the medium access control flow corresponding to the information for modifying configuration of the medium access control flow already exists in the base station, reconfiguring, by the base station, the medium access control flow and updating, by the base station, configuration of the transport bearer between the radio network controller and the base station corresponding to the medium access control flow when the base station determines that the transport bearer request indicator indicates that the transport bearer between the radio network controller and the base station needs to be reestablished.

2. The message processing method according to claim 1, wherein the information for modifying configuration of the medium access control flow comprises common medium access control flow specific information or paging medium access control flow specific information.

3. The message processing method according to claim 1, further comprising:
if the medium access control flow corresponding to the information for modifying configuration of the medium access control flow does not exist in the base station, establishing, by the base station, the medium access control flow.

4. The message processing method according to claim 1, wherein the information for modifying configuration of the medium access control flow comprises priority queue information, and the method further comprises:
determining whether a priority queue corresponding to the priority queue information exists in the base station; and
reconfiguring the priority queue if the priority queue exists in the base station, or
establishing the priority queue if the priority queue does not exist in the base station.

5. The message processing method according to claim 1, wherein the physical shared channel reconfiguration request further comprises information for deleting configuration of a medium access control flow, and the method further comprises:
if the medium access control flow corresponding to the information for deleting configuration of the medium access control flow does not exist in the base station, transmitting a process failure message to the radio network controller.

6. The message processing method according to claim 1, wherein the physical shared channel reconfiguration request further comprises information for deleting configuration of the medium access control flow, and the method further comprises:
determining whether the medium access control flow corresponding to the information for deleting configuration of the medium access control flow is the same as the medium access control flow corresponding to the information for modifying configuration of the medium access control flow; and
transmitting a process failure message to the radio network controller, if the medium access control flow corresponding to the information for deleting configuration of the medium access control flow is the same as the medium access control flow corresponding to the information for modifying configuration of the medium access control flow.

7. A base station, comprising:
a receiving unit, configured to receive a physical shared channel reconfiguration request transmitted from a radio network controller, the physical shared channel reconfiguration request comprising information for modifying configuration of a medium access control flow that is a data flow, wherein the information for modifying configuration of the medium access control flow comprises a transport bearer request indicator which indicates whether a transport bearer between the radio network controller and the base station corresponding to the medium access control flow needs to be reestablished and is valid only when the medium access control flow is reconfigured; and
a processing unit, configured to determine whether the medium access control flow corresponding to the information for modifying configuration of the medium access control flow exists, to reconfigure the medium access control flow when the medium access control flow exists, to determine whether the transport bearer request indicator indicates that the transport bearer between the radio network controller and the base station corresponding to the medium access control flow needs to be reestablished and to update configuration of the transport bearer when the transport bearer request indicator indicates the transport bearer between the radio network controller and the base station needs to be reestablished.

8. The base station according to claim 7, wherein the information for modifying configuration of the medium access control flow comprises common medium access control flow specific information or paging medium access control flow specific information.

9. The base station according to claim 7, wherein the processing unit is further configured to establish the medium access control flow, if the medium access control flow corresponding to the information for modifying configuration of the medium access control flow does not exist.

10. The base station according to claim 7, further comprising a transmitting unit configured to transmit a reconfiguration response to the radio network controller, the reconfiguration response comprising information indicating that the transport bearer between the radio network controller and the base station has been updated.

11. The base station according to claim 7, wherein the physical shared channel reconfiguration request further comprises information for deleting configuration of a medium access control flow, the processing unit is further configured to determine whether the medium access control flow corresponding to the information for deleting configuration of the medium access control flow exists and the base station further comprises:
   a transmitting unit configured to ignore the information for deleting configuration of the medium access control flow and to transmit a response message to the radio network controller, if the processing unit determines that the medium access control flow corresponding to the information for deleting configuration of the medium access control flow does not exist.

12. The base station according to claim 7, wherein the physical shared channel reconfiguration request further comprises priority queue information, and
   wherein the processing unit is further configured to determine whether a priority queue corresponding to the priority queue information exists in the base station, and to reconfigure the priority queue if the priority queue exists in the base station.

13. The base station according to claim 7, wherein the physical shared channel reconfiguration request further comprises information for deleting configuration of the medium access control flow,
   wherein the processing unit is further configured to determine whether the medium access control flow corresponding to the information for deleting configuration of the medium access control flow is the same as the medium access control flow corresponding to the information for modifying configuration of the medium access control flow, and
   wherein the base station further comprises a transmitting unit and the transmitting unit is further configured to transmit a process failure message to the radio network controller if the medium access control flow corresponding to the information for deleting configuration of the medium access control flow is the same as the medium access control flow corresponding to the information for modifying configuration of the medium access control flow.

14. A communication system, comprising:
   a radio network controller; and
   a base station,
   wherein the radio network controller is configured to transmit a physical shared channel reconfiguration request to the base station, the physical shared channel reconfiguration request comprising information for modifying configuration of a medium access control flow that is a data flow, wherein the information for modifying configuration of the medium access control flow comprises a transport bearer request indicator which indicates whether a transport bearer between the radio network controller and the base station corresponding to the medium access control flow needs to be reestablished and is valid only when the medium access control flow is reconfigured; and
   wherein the base station is configured to receive from the radio network controller the physical shared channel reconfiguration request comprising the information for modifying configuration of the medium access control flow, to determine whether the medium access control flow corresponding to the information for modifying configuration of the medium access control flow exists, to reconfigure the medium access control flow when the medium access control flow corresponding to the information for modifying configuration of the medium access control flow exists, to determine whether the transport bearer request indicator indicates that the transport bearer between the radio network controller and the base station, corresponding to the medium access control flow, needs to be reestablished and to update configuration of the transport bearer between the radio network controller and the base station when the transport bearer request indicator indicates the transport bearer between the radio network controller and the base station needs to be reestablished.

15. The communication system according to claim 14, wherein the information for modifying configuration of the medium access control flow is common medium access control flow specific information or paging medium access control flow specific information.

16. The communication system according to claim 14, wherein the base station is further configured to establish the medium access control flow, if the medium access control flow corresponding to the information for modifying configuration of the medium access control flow does not exist.

* * * * *